United States Patent

[11] 3,583,755

[72] Inventor Robert T. Hedrick, Jr.
104 Elm St., Athens, Pa. 18810
[21] Appl. No. 792,359
[22] Filed Jan. 21, 1969
[45] Patented June 8, 1971

[54] CAMPING TRAILER
14 Claims, 6 Drawing Figs.
[52] U.S. Cl. ................................................ 296/23,
52/66, 296/27
[51] Int. Cl. .................................................. B62g 3/38
[50] Field of Search ................................... 296/23, 26,
27; 52/66, 69

[56] References Cited
UNITED STATES PATENTS
3,050,331   8/1962   Mansen ....................... 296/23 X
3,466,082   9/1969   Branch ........................ 296/23
3,315,421   4/1967   Roy .............................. 296/27

Primary Examiner—Philip Goodman
Attorney—Graybeal, Cole & Barnard

ABSTRACT: A collapsible trailer for camping having a wheel-mounted main body with a rigid cover forming a top for the body. The cover or top is connected to the body by foldable, collapsible end support members permitting the cover to be raised above the body portion to sufficient height to provide standing room in the trailer. The trailer contains two double-width beds each of which is movable to one side. The bunks, when not in use, are received in tracks mounted on either end of the inside of the body so that said bunks and the folding end cover support pieces can be completely contained within the trailer when the cover has been collapsed onto the body. When the cover is up and extended the beds are supported to the side and covered by canvas or other appropriate protective material to give an expanded twin double-bed camper unit. The camper body contains stabilizing legs, table means, and storage space. A door is provided in one end cover support member to permit access to the trailer when it is expanded.

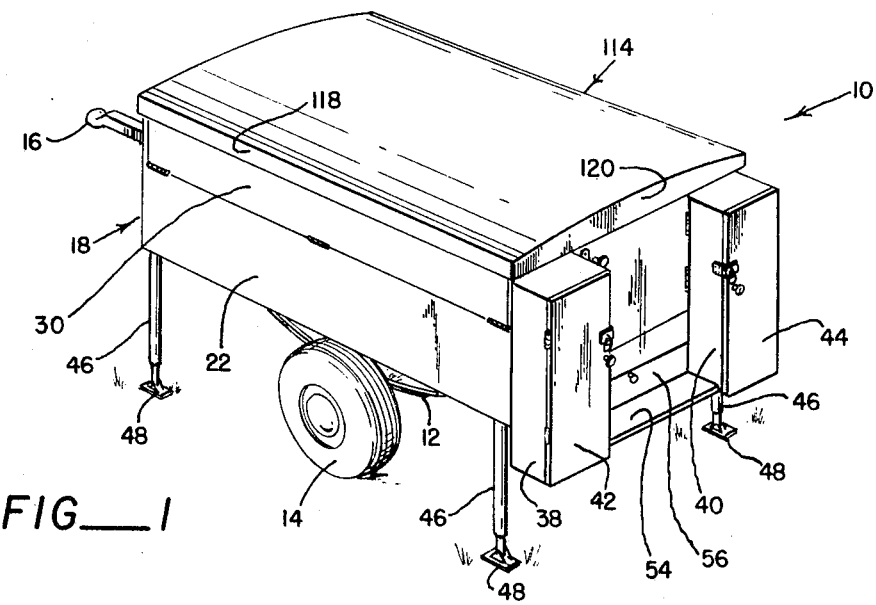
FIG__1
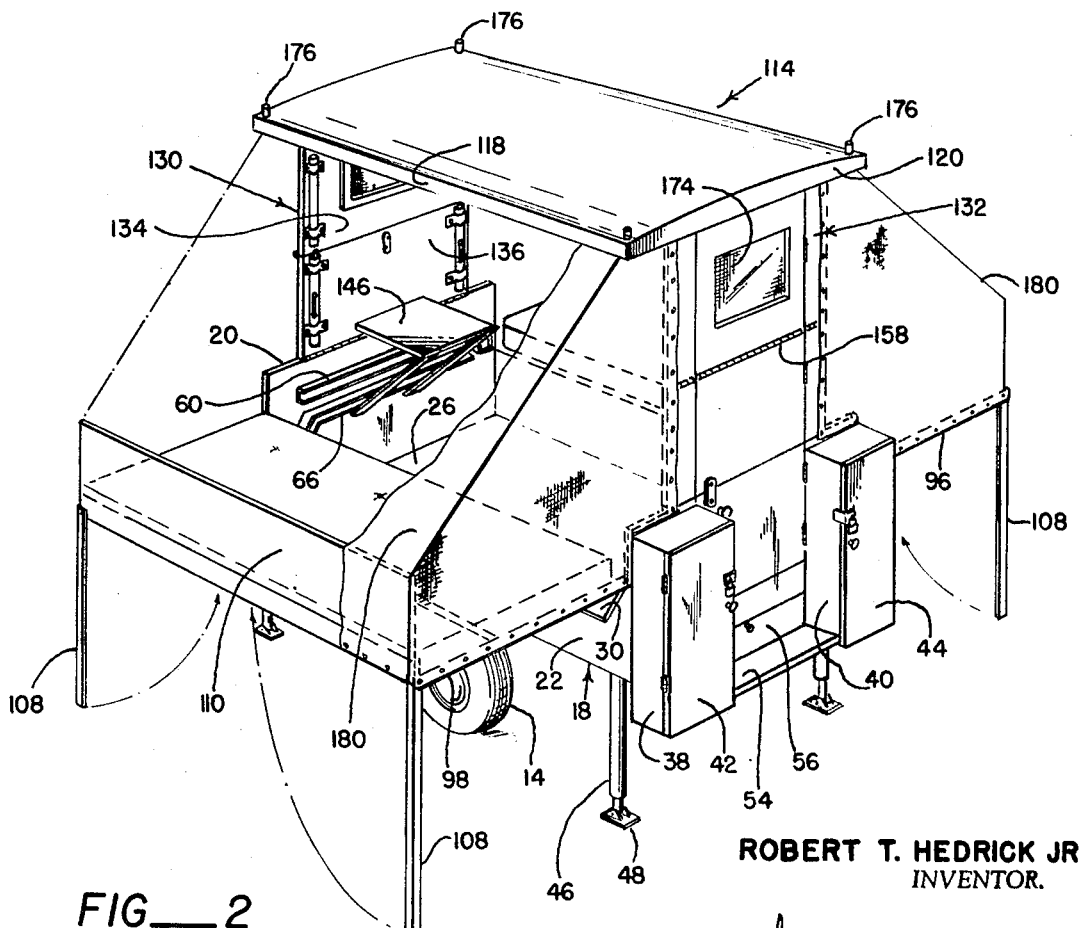
FIG__2
ROBERT T. HEDRICK JR.
INVENTOR.
BY Graybeal, Cole & Barnard
ATTORNEYS

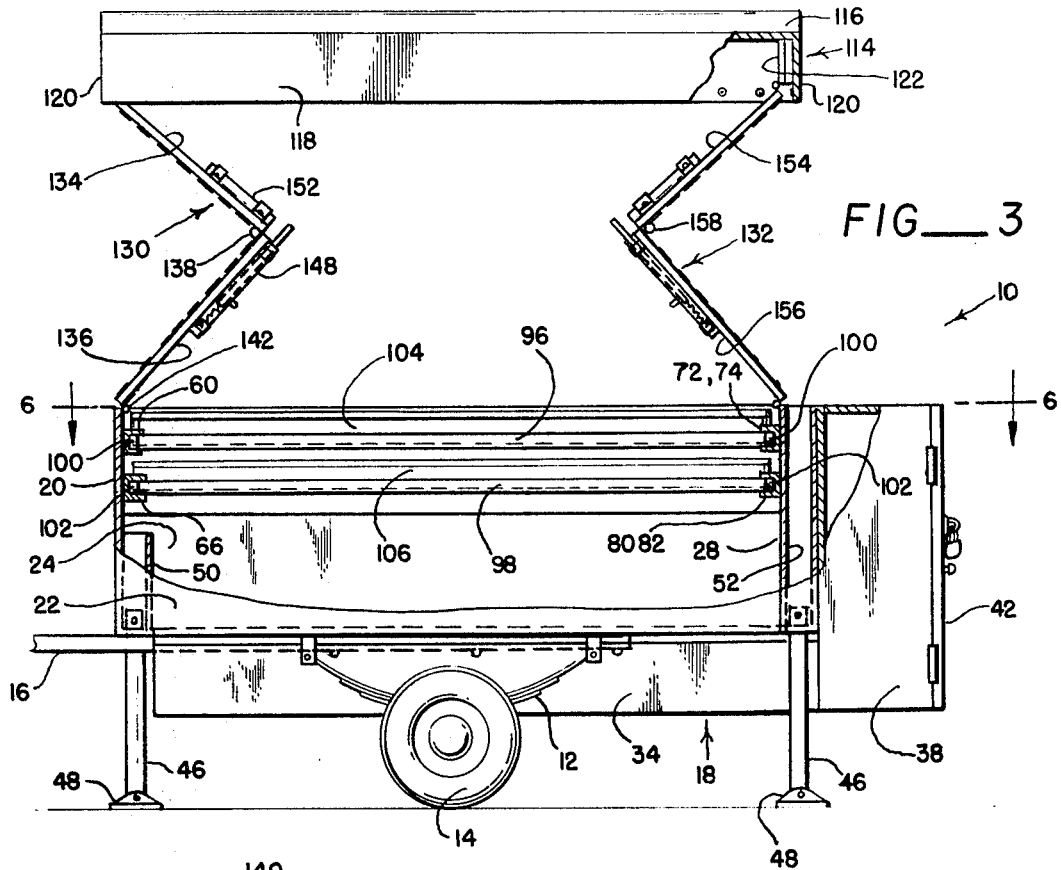
FIG__3
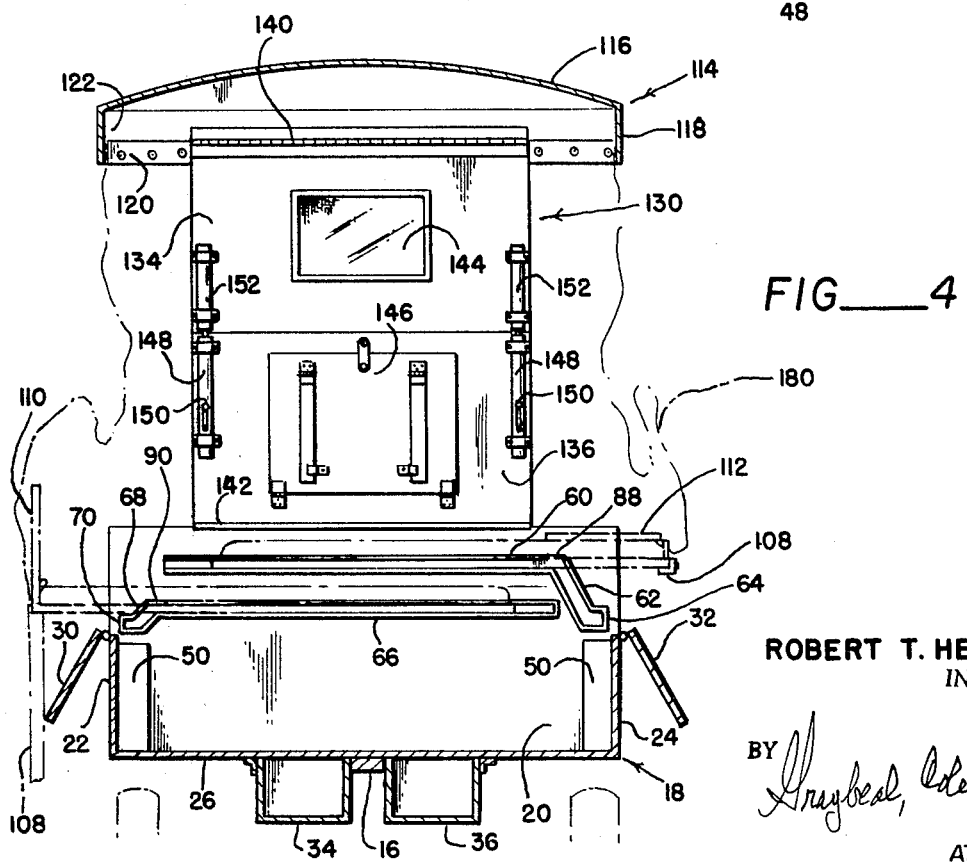
FIG__4
ROBERT T. HEDRICK JR.
INVENTOR.
BY Graybeal, Cole & Barnard
ATTORNEYS

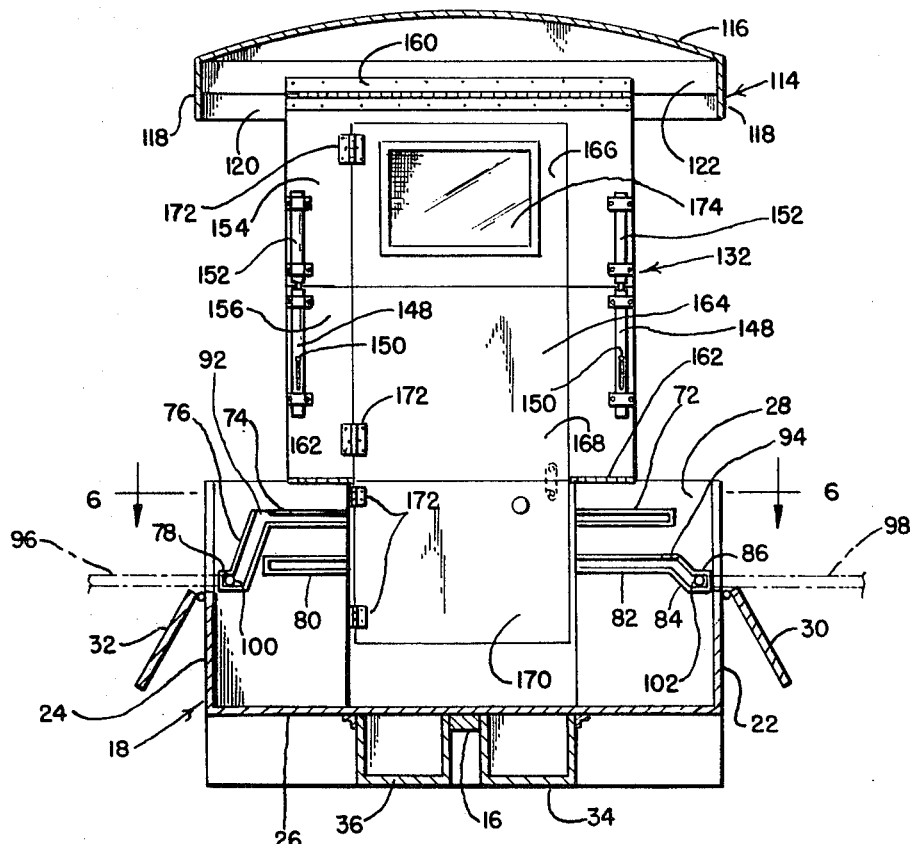
FIG_5
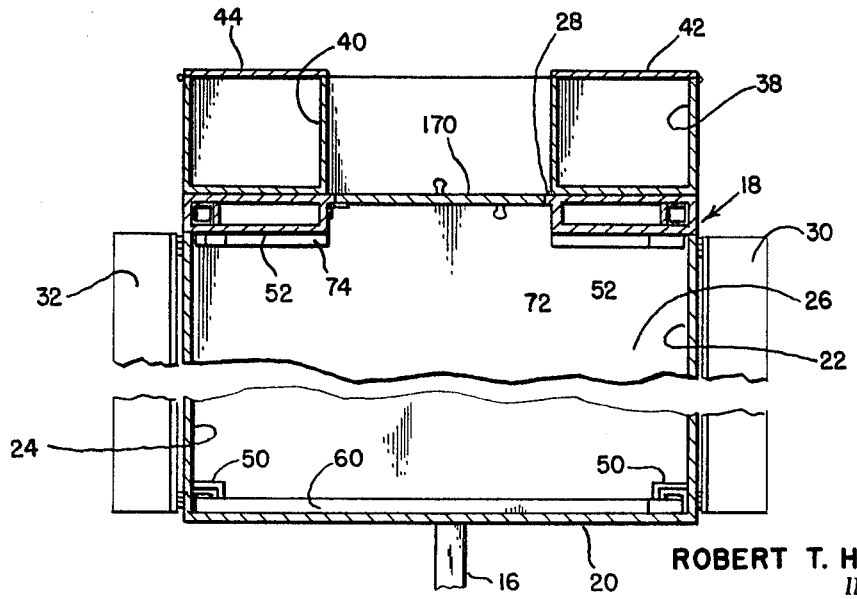
FIG_6
ROBERT T. HEDRICK JR.
INVENTOR.
BY Graybeal, Cole & Barnard
ATTORNEYS

CAMPING TRAILER

BACKGROUND OF THE INVENTION

The invention relates to a camping-type shelter trailer which can be towed by an automobile or other motor vehicle and which can be opened easily for weather-protected camping use and which can be collapsed into a compact unit when it is being moved.

There has been a great deal of activity in recent years directed to camping equipment. Most people are familiar with large camper type bodies which are carried on pickup trucks. Another familiar type of camper unit is the collapsible trailer which is towed by a vehicle such as an automobile. A great deal of the effort devoted to camping equipment has resulted in complex and therefore expensive units which are beyond the financial reach of many families. The large rigid camper bodies because of their size are subject to wind conditions particularly on high-speed freeways and throughways. High winds not only cause serious swerving but can and have actually toppled campers when the wind was severe. There has resulted with the advent of campers and living trailers a good deal of built-in equipment such as heads, showers, sinks, ice boxes, cooking ranges and other conveniences which contribute to their high cost. Collapsible trailers on the other hand are becoming popular. However, in many instances they lack durability and are flimsy, having perhaps only a flexible material top such as canvas or plastic. Thus they may provide unsatisfactory shelter in inclement weather. Many of the folding or collapsible camper trailers lack adequate bed space when opened or may lack storage room for food chests, portable freezers, camper stoves, and the like.

SUMMARY OF INVENTION

The invention includes a rectangular wheel-mounted body generally in the shape of a box which is open on top. Attached at each end of the body are two folding end supports, the lower portion of which is hingedly attached to the box and the upper part of which is hingedly attached to a generally rigid cover or roof member. The two portions of end supports are hingedly secured to each other so that they can fold and collapse inwardly when the trailer is closed. At each end of the box on the inside are track means for receiving bed or bunk-supporting structures when the trailer is in its collapsed condition. The trailer body is wide enough to accommodate two double-width bunks storable one above the other in the body and supported by the track means. When the trailer is opened the beds can be rolled out to the side of the trailer leaving the entire inside width of the body unobstructed and yet providing full double-width sleeping accommodations on each side. Canvas or other flexible weather proof material is attached between the outside edges of the bunks and the cover thus completely enclosing the camping body. Retractible, stabilizing legs are provided at each corner of the body to hold the trailer level and to add stability when it is in the expanded condition.

Accordingly, it is among the many features, advantages and objects of this invention to provide a foldable or collapsible camping trailer which is of uniquely simple construction and inexpensive to manufacture. Another feature is to provide a camping trailer which when it is expanded has double-width bunks on each side of the trailer body. Another feature is that the bunks may be easily moved on tracks from their stored position within the trailer to their expanded position on the sides of the trailer. Another feature is to provide a camping trailer with a low profile when it is collapsed so that it is not bothered by winds during highway and freeway travel. Another feature is to provide a camping trailer which has a rigid cover so that when the trailer is collapsed all the camping equipment and gear is enclosed and protected within a sturdy trailer body. Another feature is to provide a camping trailer which does not contain expensive linkage mechanisms. A still further feature is to provide a camping trailer which may be expanded and collapsed quickly and easily by a single person. Another feature is that when the trailer is in its expanded condition all of the floor area of the trailer body is accessible for use hence adding desirable space in which to set up tables or cots if desired.

BRIEF DESCRIPTION OF DRAWINGS

FIG. 1 is a perspective view showing the trailer of this invention in its collapsed condition but with the stabilizing legs down;

FIG. 2 is a perspective view of the trailer of FIG. 1, showing the invention in its fully expanded condition and including the covering over the bunks on each side;

FIG. 3 is a side elevation view partially in cross section showing additional details of the trailer construction;

FIG. 4 is an elevational cross-sectional view transversely through the body of the trailer in its expanded condition and further showing details of construction particularly at the head end of the trailer;

FIG. 5 is an elevational cross-sectional view transversely through the body of the trailer showing the back or door end of the trailer; and FIG. 6 is a partial end view in cross section taken along line 6-6 of FIGS. 3 and 5 showing additional details of construction.

DESCRIPTION OF PREFERRED EMBODIMENTS

Referring now to FIGS. 1 and 2, it will be seen that the invention comprises a trailer body generally designated by the number 10 having conventional automotive springs 12 and wheels and tires 14. The front of the trailer is also provided with a hitching tongue 16 for attachment to an automobile or other towing vehicle. The trailer itself is comprised of a basic body unit generally designated by the number 18. The body is an open rectangular box having front end wall 20, sidewalls 22 and 24, bottom wall or floor 26 and rear wall structure 28. Sidewalls 22 and 24 have hinged outwardly swinging top sections 30 and 32 which are in the position shown in FIGS. 4 and 5 when the trailer is expanded and in the position shown in FIG. 1 when the trailer is collapsed. Beneath floor 26 of the trailer body and attached to the underside thereof are two elongated compartments 34 and 36 in which may be stored tent or canopy poles and other objects which may be used in camping. Also at the rear of the trailer body are two exterior storage compartments 38 and 40 having locking doors 42 and 44. The drawings show that the trailer has stabilizing legs 46 at each corner of the body with each leg having a ground-engaging pad 48. When not in use, the stabilizing legs 46 are retracted either into the box structures 50 as shown or into double-wall structure 52 also shown in FIG. 6. A simple pin mechanism, not shown, will hold the legs retracted and extended as desired. FIGS. 1 and 2 show a step 54 between the rear storage compartments 38 and 40 and a small door 56 to permit access to the elongated storage compartments 34 and 36 on the underside of the floor.

On the inside of front end wall 20 of the trailer body is a forward upper bunk supporting track 60, see FIG. 4, which is horizontally disposed near the upper edge of wall 20. Track 60 angles down as at 62 to a closed retaining end 64 which is located just above the hinge line of swingable wall section 32 on sidewall 24. The closed restraining track end portion 64 is located close to the end of wall 20. Beneath the upper forward track 60 is a lower forward bunk-supporting track 66 also having a short inclined section 68 and a closed roller-retaining end 70 located close to the edge of wall 20 and just above the hinge line for the swingable well portion 30 on sidewall 22.

FIG. 5 shows track means mounted on the rear wall 28. The tracks however are divided into two sections to allow room for the entrance door space to be described hereinafter. Upper rear track has section 72 on one side of the door and section 74 on the other side of the door together with incline section 76 and closed roller-holding end 78. The lower rear track has one section 80 and aligned section 82 together with a shorter inclined section 84 and closed holding end 86. Again, the closed end track-holding sections are located near the edges of wall 28 and just above the hinge line of swingable side sections 30 and 32. It will be noted that the tracks both forward and rear have openings or slots 88, 90, 92 and 94 so that the outside rollers on the bunk frames can be lifted out of the tracks when the bunks are being roller into position at the sides of the trailer.

The bunks themselves have bottom support frames or springs 96 and 98. At each corner of the upper bunk support 96 are rollers 100 and at each corner of the lower bunk support 98 are rollers 102. Upper and lower mattresses 104 and 106 respectively, if desired, are supported on the frames 96 and 98. At the outer corners of each bunk support frame 96 and 98 are pivotal legs 108 which swing from a horizontal retracted position to a vertical supporting position. The inner end of each bunk support frame of course is supported by rollers engaged in the closed retaining ends of the track means. Also at the outer end of each bunk support frame are pivotal sideboards 110 and 112. FIG. 4 shows sideboard 110 in the up position, while sideboard 112 is in its folded over or down position. The sideboards keep the sleeper from accidentally falling off the bunks and also establish a spacing means so that the flexible weatherproof covering does not angle too closely over the bunks.

The rigid cover, generally designated by the number 114 includes a shallow rounded top 116 of slightly greater width and length than body 18 and has downwardly depending side flanges or edges 118 and downwardly depending end edges or flanges 120. At each end of the cover on the inside of flanges 120 is secured a reinforcing or mounting member 122. Interconnecting cover 114 with the trailer body 18 are front and rear walls or supports generally designated by the numbers 130 and 132 respectively. Forward support 130 has an upper section 134 and a lower section 136, the two sections being foldably connected by center hinge 138. The upper section 134 is attached to the forward mounting member 122 in the cover by hinge means 140 and the lower section 136 is pivotally attached to the upper edge of front wall 20 by hinge 142. The upper section may have window 144 and the lower section m  if desired, have a small table 146 which when not in use pulls back flush against lower section 136. As seen in FIG. 2, the table swings down and is supported by appropriate legs, the details of which are not essential to an understanding of this invention.

Front support 130 can be releasably held in the upright position as shown in FIGS. 2 and 4 in several ways, one of which is by the bolt means shown. One section of the support may have a spring-loaded barrel and bolt 148 with an operating handle 150 for retracting the bolt. A coaxially aligned receiver barrel 152 on the other section receives the bolt from assembly 148 to prevent support 130 from collapsing around its center hinge 138. In order to increase the stability of the wall bolt and barrel assemblies may be provided on each edge of the wall. Accordingly, when it is desired to collapse the trailer it is only necessary to pull down on the operating handles 150 to disengage the bolts and receivers and permit the support to fold inwardly as shown in FIG. 3.

In like manner, rear support 132 has upper section 154 and lower section 156. The upper and lower sections have a center hinge 158, with the upper section being hingedly attached to rear mounting member 122 by top hinge 160 and to rear wall 28 by separate hinges 162. An access door 164 is formed in the support 132 together with a section of rear wall 28 of the trailer body. Thus it will be seen that the door is comprised of three sections 166, 168 and 170 swingably mounted on hinges 172. The door, if desired, may have a window 174. Wall 132 will also be provided with bolt assemblies 148, 150, and 152 as with the front wall. Finally it will be seen that a flexible weather protective covering 180 is cut to appropriate shape to cover the bunks by being snap-attached to the bunk frames, to the forward and rear supports 130 and 132, and to cover 114.

Flexible covering 180 is attached so that it can be folded inside the collapsed trailer without being removed, if desired. Pins 176 are shown on cover 114 to allow canopy canvas to be attached to the trailer. Obviously, poles or ropes tied to trees or the like would support corners of the canopy canvas away from the trailer.

The rigid cover will allow a small boat to be carried on the trailer by appropriate detachable cradle means secured to the cover. Furthermore, canvas could be hung from the bunk frames 96 and 98 to provide additional privacy and sleeping area beneath the bunks if desired.

What I claim is:
1. A collapsible trailer, comprising:
  a. a generally rectangular box body having front, rear, side and bottom walls,
  b. a generally rigid cover for said body including a top surface and depending front, rear and side edges,
  c. a front support means hingedly attached to and interconnecting the front wall of said body and the front edge of said cover, said front support being hingedly inwardly foldable generally through the midportion thereof,
  d. a rear support means hingedly attached to and interconnecting the rear wall of said body and the rear edge of said cover, said rear support being hingedly inwardly foldable generally through the midportion thereof,
  e. generally horizontally disposed first support means on said front and rear walls for receiving a first bed frame and generally horizontally disposed second support means on said front and rear walls in generally vertically spaced relation to said first track means for receiving a second bed frame, said first and second support means being located below the top edges of said front and rear walls,
  f. first and second bed frame means slidably mounted in said first and second support means so that said bed frames may be supported within said body when said cover is collapsed onto said body and movable one to each side of said body when said trailer is expanded, and
  g. flexible covering means detachably connected to said cover, body and bed frames for protecting the interior of said trailer when expanded.

2. The trailer according to claim 1 and in which a door is composed of the foldable portions of said rear support means together with a section of said rear wall.

3. The trailer according to claim 2 and in which said first and second bed frames include pivotal legs which may be folded onto the frame when said frames are in the stored position and which may be extended downwardly to support the outer edges of the frames when the trailer is extended.

4. The trailer according to claim 3 and in which each of said sidewalls has a hinged upper section which swings outwardly and downwardly when said trailer is expanded.

5. The trailer according to claim 4 and in which said bed frames are provided with support-engaging means generally at the corners thereof for easy movement into and out of their stored position.

6. The trailer according to claim 5 and in which said first and second support means include openings for permitting the support-engaging means at the outer corners of said frames to be disengaged from said first and second support means and which also include end retaining sections to permit the inner corners of said frames to be supported by said support means when the frames are in their expanded position.

7. The trailer according to claim 6 and in which at least one elongated storage compartment is located on the underside of said trailer body in which rear storage compartments are located generally on the rear wall on each side of said door.

8. A collapsible trailer, comprising:
  a. a generally rectangular box body having front, rear, side and bottom walls,
  b. a generally rigid cover for said body including a top surface and depending front, rear and side edges, c. a front support means hingedly attached to and interconnecting the front wall of said body and the front edge of said cover, said front support being hingedly inwardly foldable generally through the mid portion thereof,
d. a rear support means hingedly attached to and interconnecting the rear wall of said body and the rear edge of said cover, said rear support being hingedly inwardly foldable generally through the mid portion thereof,
e. releasable locking means attached to each of said front and rear support means for preventing them from collapsing when the trailer is expanded,
f. generally horizontally disposed first support means on said front and rear walls for receiving a first bed frame and generally horizontally disposed second support means on said front and rear walls in generally vertically spaced relation to said first track means for receiving a second bed frame,
g. first and second bed frame means slidably mounted in said first and second support means so that said bed frames may be supported within said body generally one above the other when said cover is collapsed onto said body and movable one to each side of said body when said trailer is expanded,
h. flexible covering means detachably connected to said cover, body and bed frames for protecting the interior of said trailer when expanded, and
i. withdrawable ground-engaging stabilizing means connected to said trailer body so that when the trailer is expanded it may be firmly held in position.

9. The trailer according to claim 8 and in which a door is composed of the foldable portions of said rear support means together with a section of said rear wall.

10. The trailer according to claim 9 and in which said first and second bed frames include pivotal legs which may be folded onto the frame when said frames are in the stored position and which may be extended downwardly to support the outer edges of the frames when the trailer is expanded.

11. The trailer according to claim 10 and in which each of said sidewalls has a hinged upper section which swings outwardly and downwardly when said trailer is expanded.

12. The trailer according to claim 11 and in which said bed frames are provided with support-engaging means generally at the corners thereof for easy movement into and out of their stored position.

13. The trailer according to claim 12 and in which said first and second support means include openings for permitting the support-engaging means at the outer corners of said frames to be disengaged from said first and second support means and which also include end-retaining sections to permit the inner corners of said frames to be supported by said support means when the frames are in their expanded position.

14. The trailer according to claim 13 and in which at least one elongated storage compartment is located on the underside of said trailer body and in which rear storage compartments are located generally on the rear wall on each side of said door.